DIGITAL DATA DEFLECTION PROJECTION APPARATUS

Filed April 2, 1969

INVENTOR
DALE W. BOWMAN

BY George J. Rubens

ATTORNEYS

United States Patent Office 3,547,527
Patented Dec. 15, 1970

3,547,527
DIGITAL DATA DEFLECTION PROJECTION APPARATUS

Dale W. Bowman, San Diego, Calif., assignor to the United States of America as represented by the Secretary of the Navy Filed Apr. 2, 1969, Ser. No. 812,732
Int. Cl. G02f *1/34*
U.S. Cl. 350—285 4 Claims

ABSTRACT OF THE DISCLOSURE

Apparatus for converting digital data into a visual readout using a Cartesian coordinate optical projector. The projector includes a source of pencil beam light, an X-axis deflection system, a Y-axis deflection system, each system including a plurality of bit bars rotatably mounted on a shaft, a plurality of transducer means each associated with a separate bit bar, and stops associated with each bit bar to limit rotation of the bar, and an image screen whereby selective actuation of particular ones of said solenoids by particular combinations of digital signals positions the light beam on the screen.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In many industrial and scientific operations it is desired to convert digital data into a visual readout with as much speed and accuracy as possible. One conventional method of accomplishing this utilizes data translating personnel and plotting personnel. The obvious disadvantage of such a method is that an undue amount of time is lost by having personnel convert the digital data into a form which can be plotted on a Cartesian coordinate system and then physically plot the converted data. Such time loss may become intolerable during certain industrial or scientific operations where time is of the essence.

Another conventional method of converting digital data into a visual readout utilizes an analog servomechanism arrangement. In this method the digital data is first converted into an analog signal. The analog signal thus obtained is then used to actuate a servomechanism arrangement which selectively positions a desired reference character in the path of a non-moving beam of light. The reference character can then be displayed on a viewing screen. This method has several disadvantages. Unlike the present invention, the digital data must be converted into an analog signal, a process which can be time consuming and which can introduce error. Also, the servomechanism arrangement can introduce a cumulative mechanical error.

SUMMARY OF THE INVENTION

The invention is directed to providing means for converting digital data into a visual readout using a Cartesian coordinate optical projector. The projector includes a source of pencil beam light, an X-axis deflection system and a Y-axis deflection system. Each system includes a plurality of bit bars which are rotatably mounted on a shaft. A plurality of solenoids are associated with a separate bit bar and with mechanical stops associated with each bit bar to limit rotation of the bar. Selective actuation of particular ones of said solenoids by particular combinations of input digital data positions the light beam on an image screen.

Statements of the objects of the invention

An object of the present invention is to provide a digital deflection projection apparatus which converts digital data directly into a visual readout.

Another object of the present invention is to provide apparatus for converting digital data into visual readout using a Cartesian coordinate optical projector.

Another object of the present invention is to provide means for converting digital data directly into a visual readout by means of optical deflection systems.

DESCRIPTION OF THE PREFERRED EMBODIMENT

Figure 1:
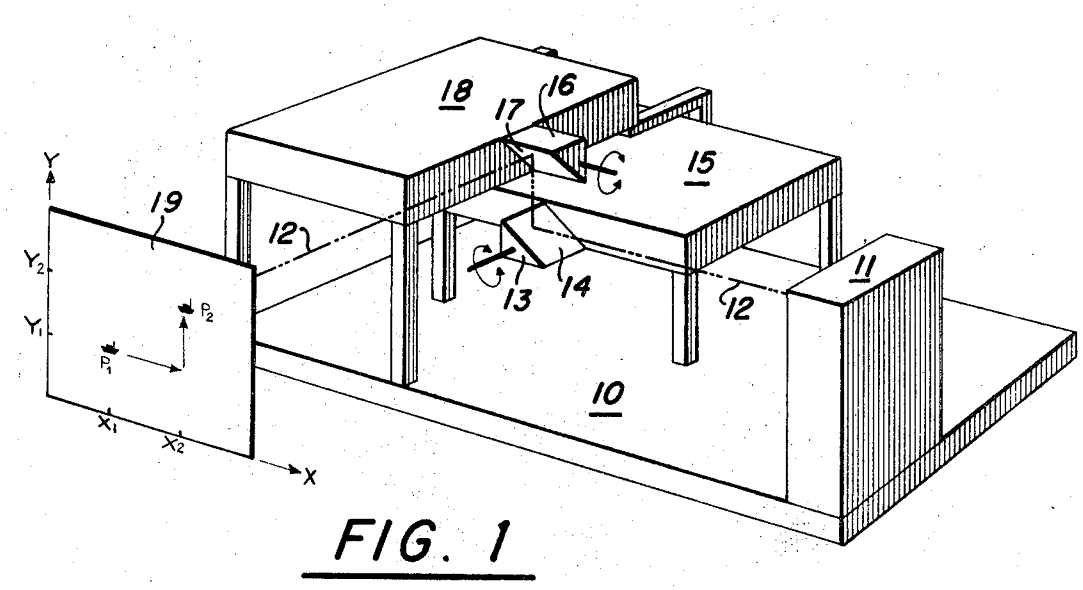
FIG. 1 is a simplified isometric view of the optical deflection system of the present invention.

FIG. 1 is a simplified isometric view of the present invention. Supported on a base 10 is a lens system 11 which is a source of pencil beam light 12. Located in the path of the pencil beam 12 is a bevel mount 13 which has a reflective surface, i.e. a front-surfaced mirror 14, mounted on one of its faces. Mirror 14 is mounted at a nominal angle of 45° to the beam path and is capable of being rotated, for example, from 37° to 53°. The bevel mount 13 is rotatably mounted and attached to an X-axis deflection system 15. The X-axis deflection system 15 functions to rotate the bevel mount 13 in the directions indicated. Located in the path of the light beam reflected from mirror 14 is a second bevel mount 16 which has a reflective surface, i.e. a mirror 17, mounted on one of its faces. Mirror 17 is likewise mounted at a nominal angle of 45° to the beam path and is capable of being rotated from 37° to 53°. Bevel mount 16 is rotatably mounted and attached to a Y-axis deflection system 18. The Y-axis deflection system functions to rotate bevel mount 16 in the direction indicated. Both the X-axis deflection system 15 and the Y-axis deflection system 18 are mounted on base 10. It should be noted that the axis of rotation of bevel mount 13 is perpendicular to the axis of rotation of bevel mount 16.

Deflection of the light beam 12 is accomplished in the following manner. Light beam 12 impinges first upon mirror 14. Mirror 14 reflects the beam onto a second mirror 17. Mirror 17 reflects the beam a second time. The resultant beam from mirror 17 is then projected onto a viewing screen as point $P_1$ having Cartesian coordinates $X_1$, $Y_1$. As mirror 14 is rotated in a clockwise manner, for example, it can be seen that the X coordinate shifts from the first value $X_1$ to a second value $X_2$. If mirror 17 is then rotated in a clockwise manner, the Y coordinate shifts from the first value $Y_1$ to a second value $Y_2$. As a result the light beam 12 is shifted from point $P_1$ to point $P_2$ having coordinates $X_2$, $Y_2$. Obviously, the X and Y coordinates can be shifted in any direction desired by rotating the mirrors in an appropriate manner.

Figure 2:
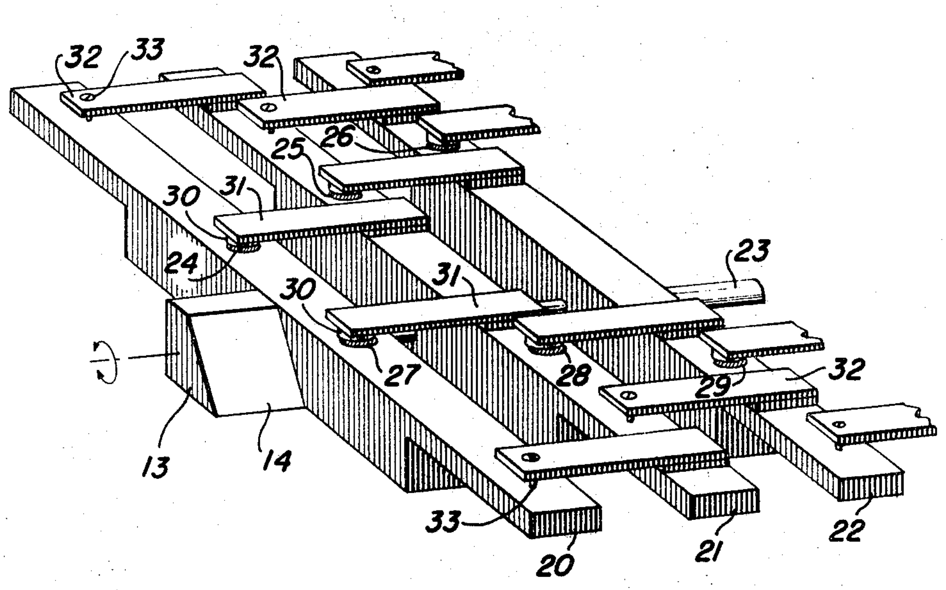
FIG. 2 is a simplified isometric view of a portion of the X-axis optical deflection system of the present invention.

Rotation of the bevel mounts and mirrors is accomplished in a unique manner as can be seen from FIG. 2 and the following discussion. FIG. 2 shows in a simplified isometric view, a portion of the X-axis deflection system 15. Since the operation of the Y-axis deflection system 18 is identical to that of system 15, only the operation of system 15 will be discussed.

In FIG. 2, a plurality of bit bars 20, 21 and 22 are shown assembled and symmetrically supported on a single shaft 23 about which shaft the bit bars are free to rotate. In a typical deflection system eight bit bars are used although any given number of bit bars can be used; for purposes of explanation however, only three bit bars need be shown.

Attached and supported on bit bar 20 is rotatable bevel mount 13 which can be seen from the figure, rotates in accordance with the rotational movement of bit bar 20.

Also mounted and supported on bit bar 20 are two solenoids 24 and 27 which, as can be seen, are recessed in bar 20. Solenoid 24 represents a "0" state solenoid and solenoid 27 represents a "1" state solenoid. In a similar manner bit bar 21 has mounted and supported thereon "0" state solenoid 25 and "1" state solenoid 28, and bit bar 22 has supported and attached thereon "0" state solenoid 26 and "1" state solenoid 29. Supported directly above each solenoid is a pole piece 30 which is mounted on a support member 31.

Also shown attached to the bit bars are plurality of stop supports 32 which have attached thereto adjustment screws 33. The adjustment screws function as adjustable stops to limit the angular rotation of the bit bars. That is, the screws 33 are adjusted such that the respective bit bars can rotate through an angle determined by the distance from the screws to the bit bars. Obviously as the above distance is increased or decreased, the angle of rotation of a bit bar is likewise increased or decreased.

Adjustable stops 33, by limiting the rotation of the bit bars, also prevent "overshooting" of light beam 12 on the screen so that the beam is thus accurately positioned on the screen.

The bit bars are caused to rotate by a magnetic force generated by the solenoids which are located in a recessed manner within the bars. One end of each bit bar contains a "1" state solenoid, and the other end contains a "0" state solenoid. Only one solenoid on each bit bar can be energized at a time in response to the input digital data which is in the form of binary digital commands. A command is designated as the information contained in the form of binary energy levels in a combination of two or more binary bits. Thus if "0" state solenoid 24 is energized in response to the digital input, the magnetic force created in the solenoid causes bit bar 20 and mirror 14 to rotate in a clockwise manner. If "1" state solenoid 27 is energized in response to the digital input, the magnetic force created in the solenoid causes bit bar 20 and mirror 14 to rotate in a counterclockwise manner.

In a typical example, the digital input word can consist of twenty-six bits: eleven bits for X (horizontal) deflection, eleven bits for Y (vertical) deflection, and four bits for symbol selection. Eight out of the eleven bits of the X deflection part of the input digital word are used by the X deflection system. A range selection switch determines which eight bits are to be used.

Summation of the eight bits is accomplished mechanically through for example, eight bit bars. The adjustment screws or stop screws 33 are mounted and supported on stop support members 32 which are connected to and supported on the adjacent bit bar. For example, bit number 20 adjustment screws 33 are supported on support members 32 which are attached to bit bar 21. In a similar fashion the adjustment screws 33 for bit bar 21 are supported on support members 32 which are attached to bit bar 22. The remaining bit bars which are not shown in this figure, are connected in a similar fashion. Thus if any bit bar is moved, the resulting movement is transmitted mechanically through all bit bars located to the left of the bit bar moved up to bit bar 20 to which the mirror 14 is mounted.

As is well known to those skilled in the art the angle through which the projected light beam 12 is rotated is equal to twice the angle through which the mirror is rotated.

In a typical example, the eight bit bars are weighted in binary code as follows where bit bars A, B and C represent bit bars 20, 21 and 22, respectively, in FIG. 2:

Bit bar A=8°
Bit bar B=4°
Bit bar C=2°
Bit bar D=1°
Bit bar E=30 minutes
Bit bar F=30 minutes
Bit bar G=7½ minutes
Bit bar H=3¾ minutes To illustrate the preceding discussion, the operation of the deflection system of FIG. 2 in response to various typical digital commands will be described.

For example, assume that a digital command or word 101 is used to actuate the system. Solenoid 27 is energized thereby creating a magnetic force. Magnetic pole piece 30 thus attracts solenoid 27, thereby causing a counterclockwise rotation of bit bar 20 through an angle of 8°. Solenoid 28 is not energized, therefore bit bar 21 does not rotate. Solenoid 29 is energized, thereby creating a magnetic force. As in the case of solenoid 27, a magnetic pole piece, identical to pole piece 30, attracts solenoid 29, thereby causing a counterclockwise rotation of bit bar 22 through an angle of 2°. This rotation is mechanically added to the 8° rotation by means of support members 32 and adjustment screws 33. Thus the mirror 14 is rotated through a total angle of 10°, and light beam 12 is rotated through an angle of 20°.

If a digital command or word 010 is used, only solenoid 28 is energized. Thus bit bar 21 rotates in a counterclockwise manner through an angle of 4°.

Utilizing eight bits in the deflection system, for example, the visual screen or plot board can be broken up into 256 discrete positions from side to side. Thus the projected light beam 12 and the selected symbol can be deflected to any one of these 256 positions. On a sixty inch plot board, these positions are $\frac{15}{64}$ inch apart; hence a resolution of $\frac{15}{64}$ inch can be obtained by the present invention.

Non-linearity due to the plot board being a flat surface and optical error due to interaction of the two deflection systems on the optical path can be compensated for by electronic means or optical means known to those skilled in the art.

As mentioned previously, the position or indication may be represented by a variety of selectable symbols. Lens system 11 which includes a cylindrical film wheel composed of sixteen film segments is utilized in the present invention to provide a capability of symbol selection in addition to being a source of pencil beam light. The film wheel is indexed by a stepping switch until a four bit code on the film wheel matches the four bit symbol selection portion of the digital input word. The selected symbol is then projected onto a viewing screen or plot board at the indicated position.

Although, solenoids are utilized in the preferred embodiment, other transducer means which convert electrical signals into mechanical motion can be utilized. Other transducers which may be used in the present invention include relays and piezoelectric crystals. Nonelectric transducers may include hydraulic plungers and mechanical push buttons.

Thus, it can be seen that a new and unique apparatus for converting digital data into visual readous in a rapid and accurate manner has been disclosed.

Obviously many modifications and variations of the present invention are possible in the light of the above teachings. It is therefore to be understood that within the scope of the appended claims the invention may be practiced otherwise than as specifically described.

I claim:

1. A digital data deflection projection apparatus for converting digital data into a visual readout comprising:

(a) a source of pencil beam light;

(b) an X-axis deflection system having optical reflective means located in the path of said pencil beam light;

(c) a Y-axis deflection system having optical reflective means located in the path of the pencil beam light reflected from the reflective means of said X-axis deflection system;

(d) each of said deflection system systems including a plurality of bit bars rotatably mounted upon a shaft, said shafts being perpendicular to each other;

(e) a plurality of paired solenoids each of which is associated with a separate bit bar and with stop means associated with each bit bar to limit rotation of said bar; and (f) an image screen whereby selective actuation of particular ones of said solenoids by particular combinations of input digital signals positions said light beam on said screen.

2. The apparatus of claim 1 wherein each of said paired solenoids consists of an "0" state solenoid and a "1" state solenoid mounted on opposite sides of said shaft.

3. The apparatus of claim 1 wherein each of said optical reflective means rotate in accordance with the rotation of the bit bars associated with its respective deflection system.

4. A deflection projection apparatus for converting an input digital signal into a Cartesian coordinate position indication comprising:

(a) a source of pencil beam light;

(b) first reflective means having an axis of rotation perpendicular to the X-axis, said first reflective means being located in the path of said beam light;

(c) second reflective means having an axis of rotation perpendicular to the Y-axis, said second reflective means being located in the path of the beam light reflected from said first reflective means;

(d) said first reflective means having a plane face mounted at a nominal angle of 45° with respect to said beam light;

(e) said second reflective means having a plane face mounted at a nominal angle of 45° with respect to the beam light reflected from said first reflector means;

(f) each of said reflective means further being rotatably mounted on mutually perpendicular shafts;

(g) a plurality of bit bars rotatably mounted upon each of said shafts;

(h) a plurality of paired transducer means each of which is associated with a separate bit bar and with stop means associated with each bit bar; and (i) an image screen whereby selective actuation of particular ones of said paired transducer means by particular combinations of input digital signals positions said light beam on said screen.

References Cited

UNITED STATES PATENTS

| | | | |
|---|---|---|---|
| 3,315,563 | 4/1967 | Harper et al. | 350—285 |
| 3,352,196 | 11/1967 | Hammond | 350—285UX |

RONALD L. WILBERT, Primary Examiner

P. K. GODWIN, Assistant Examiner

U.S. Cl. X.R.

324—97; 340—347